(12) United States Patent
Nguyen Canh et al.

(10) Patent No.: US 12,243,277 B2
(45) Date of Patent: Mar. 4, 2025

(54) METHOD AND APPARATUS TO SYMMETRIZE A MESH CROSS-REFERENCE TO RELATED APPLICATION

(71) Applicant: Tencent America LLC, Palo Alto, CA (US)

(72) Inventors: Thuong Nguyen Canh, San Bruno, CA (US); Chao Huang, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 40 days.

(21) Appl. No.: 18/240,660

(22) Filed: Aug. 31, 2023

(65) Prior Publication Data

US 2024/0202980 A1     Jun. 20, 2024

Related U.S. Application Data

(60) Provisional application No. 63/433,726, filed on Dec. 19, 2022.

(51) Int. Cl.
*G06T 9/00* (2006.01)
*H04N 19/119* (2014.01)
*H04N 19/20* (2014.01)

(52) U.S. Cl.
CPC ........... *G06T 9/001* (2013.01); *H04N 19/119* (2014.11); *H04N 19/20* (2014.11)

(58) Field of Classification Search
None
See application file for complete search history.

(56) References Cited

U.S. PATENT DOCUMENTS

| | | | |
|---|---|---|---|
| 5,945,996 A | 8/1999 | Migdal et al. | |
| 2017/0076490 A1 | 3/2017 | Jenkins | |
| 2019/0318508 A1* | 10/2019 | Hemmer | G06T 9/004 |
| 2021/0105504 A1 | 4/2021 | Hur et al. | |

OTHER PUBLICATIONS

International Search Report dated Dec. 13, 2023 issued by the International Searching Authority in International Application No. PCT/US23/32255.
Written Opinion dated Dec. 13, 2023 issued by the International Searching Authority in Application No. PCT/US23/32255.

* cited by examiner

*Primary Examiner* — Xiaolan Xu
(74) *Attorney, Agent, or Firm* — Sughrue Mion, PLLC

(57) ABSTRACT

A method performed by encoder comprises partitioning a mesh into a first side and a second side; determining, for a first vertex located on the first side, whether a first perpendicular line extending from the first vertex intersects with two or more surfaces of the mesh on the second side, each intersection of the first perpendicular line corresponding to an intersected vertex on the second side; based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex; and generating a new connection in the mesh.

20 Claims, 9 Drawing Sheets

```
q = floor(k / h)
for (j = 0; j < h; j++) {
    start = j * q
    end = min((j+1) * q, k)
    Fj = {F[start: end], $\tilde{v}_{R/L}$} = {v_start : v_end, $\tilde{v}_{R/L}$}
}
```

FIG. 7

METHOD AND APPARATUS TO SYMMETRIZE A MESH CROSS-REFERENCE TO RELATED APPLICATION

CROSS-REFERENCE TO RELATED APPLICATION

This application claims priority from U.S. Provisional Application No. 63/433,726 filed on Dec. 19, 2022, the disclosure of which is incorporated herein by reference in its entirety.

FIELD

This disclosure is directed to a set of advanced video coding technologies. More specifically, the present disclosure is directed to a method and apparatus for symmetrizing a mesh.

BACKGROUND

VMesh is an ongoing MPEG standard to compress meshes. The current VMesh reference software compresses meshes based on decimated base meshes, displacements vectors and motion fields. The displacements are calculated by searching the closest point on the input mesh with respect to each vertex of the subdivided based mesh. The displacement vectors are transformed into wavelet coefficients by a linear lifting scheme, and then the coefficients are quantized and coded by a video codec or arithmetic codec.

Reflection symmetry is a popular characteristic of mesh coding, especially computer generated meshes. Symmetry was utilized to compress symmetry mesh. Vertices are divided into a left and right part of a symmetry plane. The left part is encoded by mesh coding while the right part is encoded by a symmetry prediction and displacement coding.

However, 3D mesh is often not perfectly symmetric, but rather has approximated symmetry, where only the surface is approximately symmetric. One-to-one mapping between left and right symmetry is essential for subsequent symmetry coding tools including displacement, prediction, etc.

SUMMARY

According to one or more embodiments, a method performed by at least one processor of encoding a mesh, comprises partitioning a mesh into a first side and a second side via a partition plane, wherein the second side is opposite to the first side in the mesh. The method further comprises determining, for a first vertex located on the first side, whether a first perpendicular line extending from the first vertex intersects with two or more surfaces of the mesh on the second side, each intersection of the first perpendicular line corresponding to an intersected vertex on the second side. The method further comprises, based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex. The method further comprises generating a new connection in the mesh between the second vertex and another vertex on the partition plane.

According to one or more embodiments, an encoder comprises at least one memory configured to store program code: and at least one processor configured to read the program code and operate as instructed by the program code. The program code includes partitioning code configured to cause the at least one processor to partition a mesh into a first side and a second side via a partition plane, wherein the second side is opposite to the first side in the mesh. The program code includes first determining code configured to cause the at least one processor to determine, for a first vertex located on the first side, whether a first perpendicular line extending from the first vertex intersects with two or more surfaces of the mesh on the second side, each intersection of the first perpendicular line corresponding to an intersected vertex on the second side. The program code includes first selecting code configured to cause the at least one processor to select, based on the determination the first perpendicular line intersects with two or more surfaces of the mesh on the second side, select one of the intersected vertices on the second side as a approximated second vertex corresponding to the first vertex based on a shortest distance between each intersected vertex and a predicted vertex on the second that is symmetric to the first vertex. The program code includes first generating code configured to cause the at least one processor to generate a new connection in the mesh between the approximated second side vertex and a vertex on the partition plane.

According to one or more embodiments, a non-transitory computer readable medium having instructions stored therein, which when executed by a processor in an encoder cause the processor to execute a method of comprising: partitioning a mesh into a first side and a second side via a partition plane, wherein the second side is opposite to the first side in the mesh. The method further comprises determining, for a first vertex located on the first side, whether a first perpendicular line extending from the first vertex intersects with two or more surfaces of the mesh on the second side, each intersection of the first perpendicular line corresponding to an intersected vertex on the second side. The method further comprises, based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex. The method further comprises generating a new connection in the mesh between the second vertex and another vertex on the partition plane.

BRIEF DESCRIPTION OF THE DRAWINGS

Further features, the nature, and various advantages of the disclosed subject matter will be more apparent from the following detailed description and the accompanying drawings in which:

FIG. 7 illustrates an example algorithm for adding new connectivity to a mesh.

DETAILED DESCRIPTION

Figure 1:
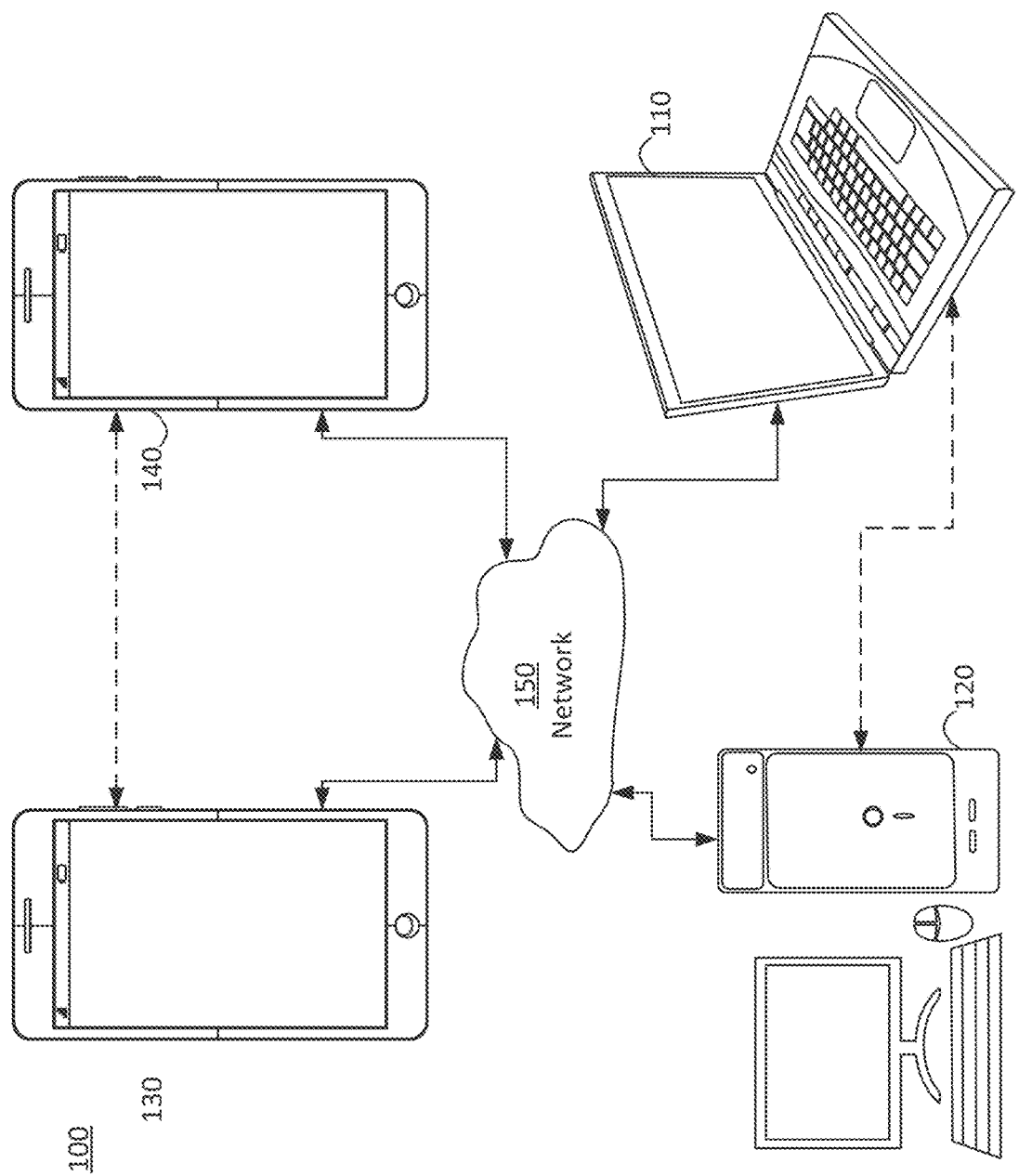
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
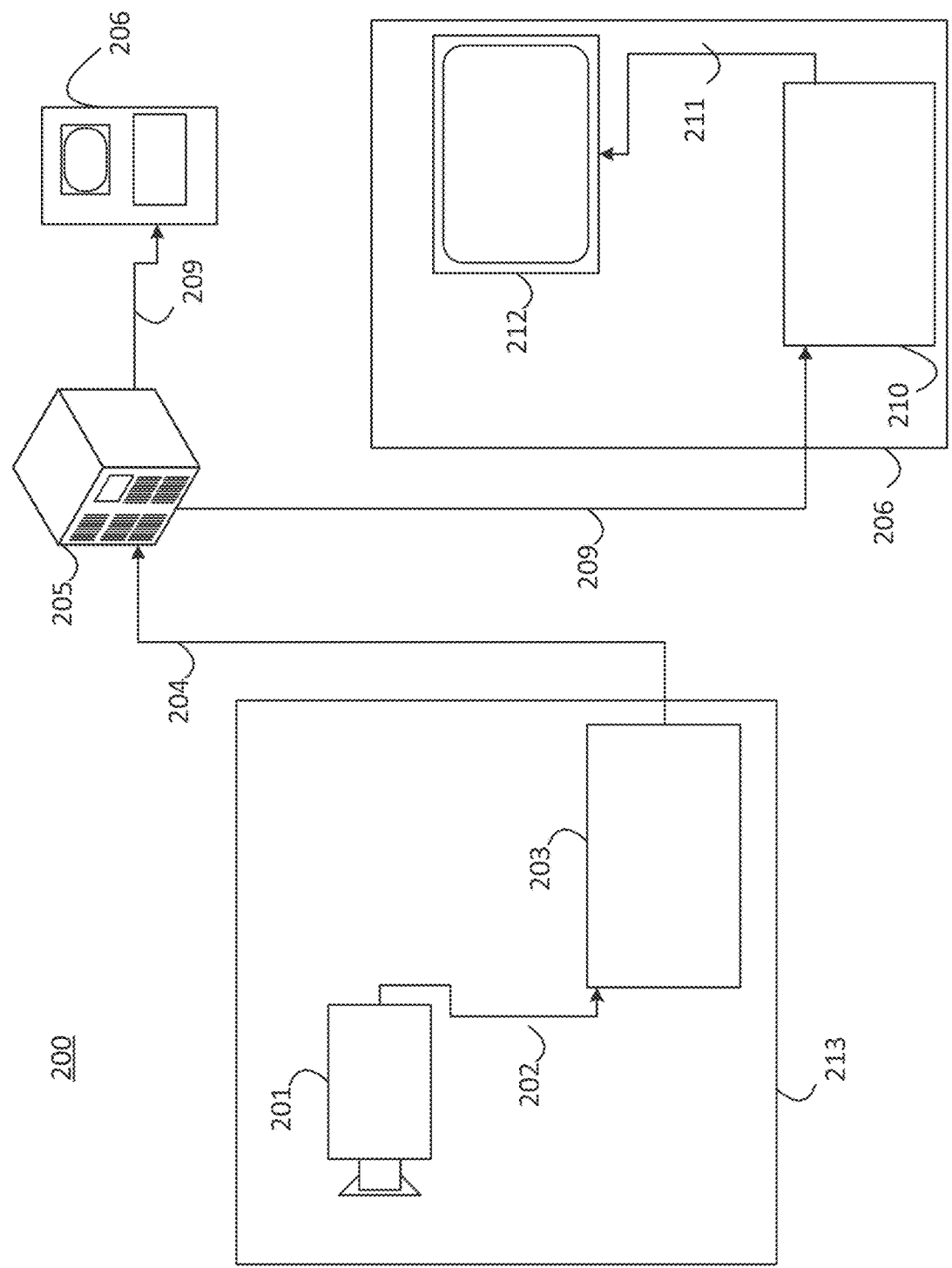
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 209 may be encoded according to certain video coding/compression standards.

Embodiments of the present disclosure are directed to symmetrizing a mesh. The embodiments provide enhanced symmetry based on improved one to one mapping of vertices on different sides of a mesh.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face. A mesh may be partitioned by plane into a left side (e.g., first side) and a right side (e.g., second side opposite to the first side). In one or more examples, a side of a mesh may refer to one side of a partition plane that partitions the mesh. In one or more examples, a surface or mesh surface may refer to a plane or face defined by three or more vertices and edges that connect these vertices.

A symmetry mesh $\mathcal{M}$ may have a mirror symmetry plane p that separates vertices v into a set of left vertices $\mathcal{V}_L$, a set of right vertices $\mathcal{V}_R$, and a set of in symmetry plane vertices $\mathcal{V}_J$; faces $\mathcal{F}$ into a set of left faces $\mathcal{F}_L$, a set of right faces $\mathcal{F}_R$, and a set of cross symmetry plane faces $\mathcal{F}_C$.

According to one or more embodiments, a method symmetrizes geometry vertices and connectivity of a polygonal mesh. The polygonal mesh may be a 3D mesh. The output mesh from the symmetrize process may be perfect symmetry or near perfect symmetry with a one-to-one mapping between left and right vertices. The output of the symmetrize process may be the symmetry vertex set $\mathcal{V}_S$. In one or more examples, the symmetry vertex set may be initialized as an empty set. $\mathcal{V}_S = \emptyset$.

Figure 3:
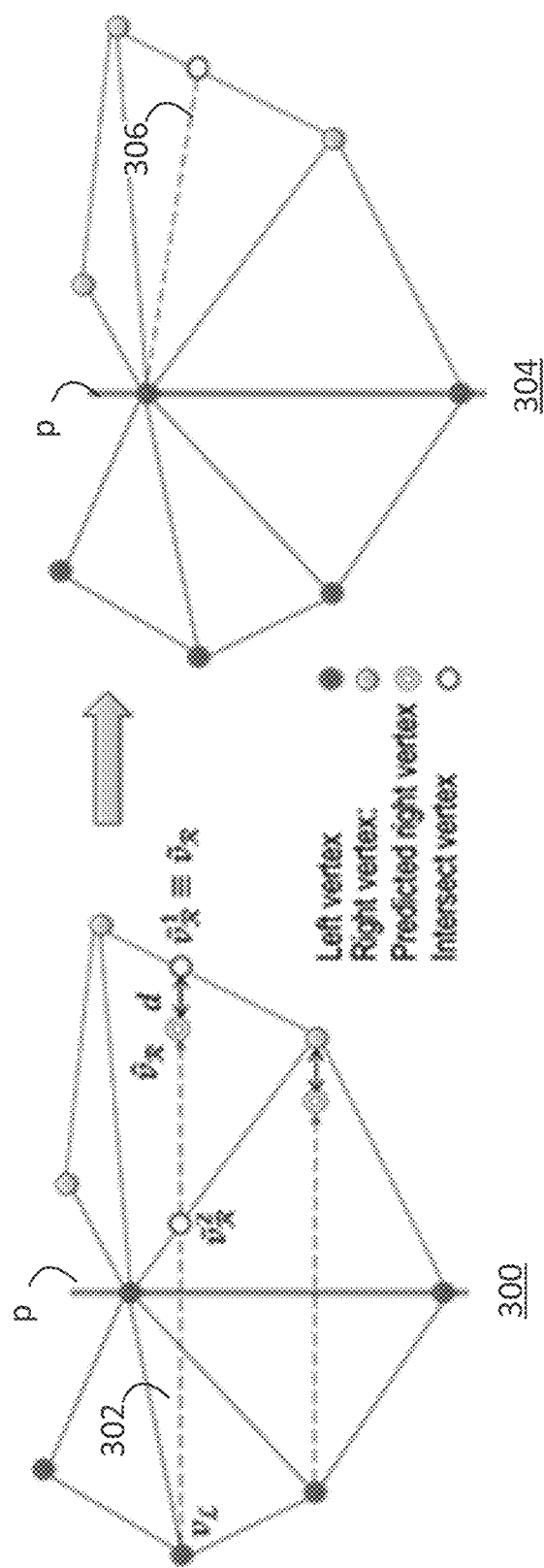
FIG. 3 illustrates an example left to right pass of a mesh.

FIG. 3 illustrates performing a left to right pass of a mesh, in accordance with one or more embodiments. The mesh 300 may be partitioned according to a symmetry plane p that partitions the mesh 300 into a left side (e.g., first side) and a right side (e.g., a second side opposite to the first side). In one or more examples, for each vertex in left side $v_L \in \mathcal{V}_L$, a line $\ell_L$ 302 that is perpendicular to the symmetry plane p and passes through the vertex $v_L$ is defined. This perpendicular line 302 may intersect with the right surface at $c_L$ points $\bar{v}_R^i$, i={1, . . . , $c_L$}. The points of intersection of the perpendicular line with a surface mesh may be referred to as intersected vertices. As illustrated in FIG. 3, the perpendicular line 302 intersects the mesh 300 on the right side at the following points: $\bar{v}_R^2$ and $\bar{v}_R^1$. The vertex $\hat{v}_R$ may be the predicted symmetry vertex of $v_L$. In one or more examples, the points nearest to $\hat{v}_R$ may be selected as the approximated vertex as $\tilde{v}_R$ as follows.
Eq. (1):

$$\tilde{v}_R = \arg\min_{\forall i \in [1, c_L]} |\bar{v}_R^i - \hat{v}_R|_2^2.$$

In one or more examples, both $v_L$ and $\tilde{v}_R$ may be classified as symmetry vertex set, $\mathcal{V}_S \leftarrow \{ v_L, \tilde{v}_R \}$, as illustrated in FIG. 3. As illustrated on the right side of FIG. 3, mesh 304 illustrates a modified mesh with respect to mesh 300 in which new connectivity (e.g., new line 306) may be added for the approximated vertex $\tilde{v}_R$ as described in further detail below.

The difference between the predicted and approximated right symmetry vertex may be defined as a symmetry displacement as follows.

$$d = \tilde{v}_R - \hat{v}_R. \qquad \text{Eq. (2):}$$

Figure 4:
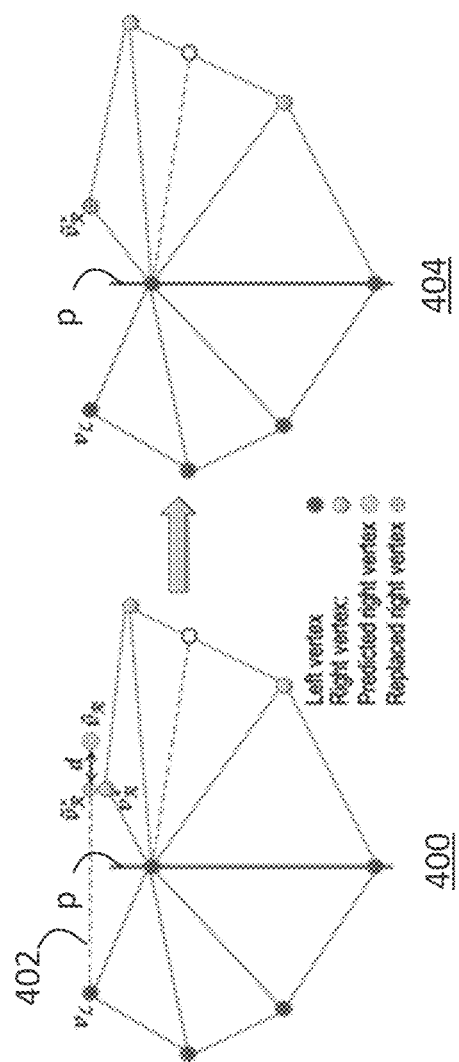
FIG. 4 illustrates an example out of an out-of-range vertex when performing the left to right pass of a mesh.

FIG. 4 illustrates a mesh 400 in which a perpendicular line 402 does not intersect a surface on the right side of mesh 400. According to one or more embodiments, if there is no intersection between line $\ell_L$ and the right surface, or out-of-range vertices, the nearest right vertices to the predicted symmetry vertices $\hat{v}_R$ is found as $v_R^*$.

$$v_R^* = \arg\min_{v_R \in V_R} |\hat{v}_R - v_R|_2^2. \qquad \text{Eq. (3)}$$

The projection of $v_R^*$ to line $\ell_L$ 402 is $\tilde{v}_R^*$, which may replace the original right vertex $v_R$. This vertex may also be included in the symmetry set, $\mathcal{V}_S \leftarrow \{ \tilde{v}_R^* \}$. The right side of FIG. 4 illustrates a modified mesh 404 with respect to the mesh 400 in which the out-of-range vertex $\tilde{v}_R^*$ is added to the mesh.

In one or more examples, the difference between the predicted and approximated right symmetry vertex is defined as a symmetry displacement as follows.

$$d = \tilde{v}_R^* - \hat{v}_R. \qquad \text{Eq. (4):}$$

According to one or more embodiments, a threshold $\tau$ may be pre-defined as the minimum distortion threshold. For all vertex on the right $v_L$, the nearest approximated vertex from $\mathcal{V}_S$ may be determined as follows.

$$v_R^*, \varepsilon_R^* = \arg\min_{v \in V_S} |v_R - v|_2^2, \qquad \text{Eq. (5)}$$

where $\varepsilon_R^*$ is the minimum distance. If the distance to nearest symmetry vertex $\varepsilon_R^*$ is larger than $\tau$, this vertex may be classified as a need symmetry process.

Figure 5:
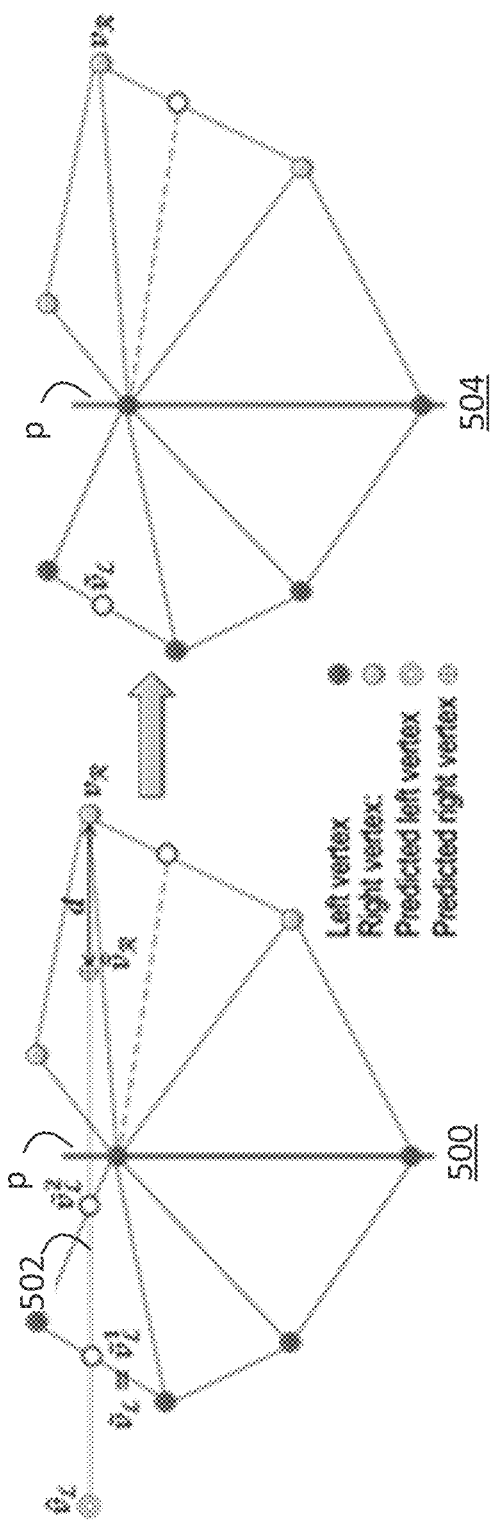
FIG. 5 illustrates an example right to left pass of a mesh.

Accordingly, if the distance is greater than the threshold, a similar process as described above from left to right may be performed from right to left. FIG. 5 illustrates performing a right-to-left process, in accordance with one or more embodiments.

For example, a $\ell_R$ line 502 in mesh 500 that passes though $v_L$ and perpendicular to symmetry plane p is defined. This line may intersect with the left surface at $c_\mathcal{R} \geq 0$ points $\bar{v}_L^i$, i={1, ..., $c_\mathcal{R}$}, where $\hat{v}_L$ is the symmetry vertex of $v_L$. The point is nearest to $\hat{v}_L$ is defined as $\tilde{v}_L$ as follows.

$$\tilde{v}_L = \arg\min_{\forall i \in [1, c_\mathcal{R}]} |\bar{v}_L^i - \hat{v}_L|_2^2. \qquad \text{Eq. (6)}$$

In one or more examples, the predicted symmetry vertex of $\tilde{v}_L$, denoted as $\hat{\tilde{v}}_\mathcal{R}$, may be defined. Both $\tilde{v}_L$ and $v_\mathcal{R}$ may be set to the symmetry vertices, $\mathcal{V}_s \leftarrow \{\tilde{v}_L, v_\mathcal{R}\}$.

In one or more examples, the difference between the right vertex $v_\mathcal{R}$ and the predicted symmetry vertex $\hat{\tilde{v}}_\mathcal{R}$ is considered as a displacement as follows.

$$d = v_\mathcal{R} - \hat{\tilde{v}}_R \qquad \text{Eq. (7)}$$

Mesh 504 illustrates an example of a modified mesh with respect to mesh 500 in which vertex $\tilde{v}_L$ is added to mesh 504.

According to one or more embodiments, if there is no intersection between line $\ell_\mathcal{R}$ and the left surface (e.g., $c_\mathcal{R} = 0$), an out-of-range vertex may be determined in the right-to-left pass in a similar manner as the left-to-right pass. In one or more examples, the nearest left vertices to the predicted symmetric vertex $\hat{v}_L$ may be found as $v_L^*$ as follows.

$$v_L^* = \arg\min_{v_L' \in V_L} |\hat{v}_L - v_L'|_2^2 \qquad \text{Eq. (8)}$$

The projection of $v_L^*$ to line $\ell_\mathcal{R}$ may be $\tilde{v}_L^*$, which may replace the original right vertex $v_L$. This vertex may also be included in the symmetry set, $\mathcal{V}_s \leftarrow \{\tilde{v}_L^*\}$.

According to one or more embodiments, an original right vertex $v_\mathcal{R}$ may be replaced by a corresponding approximated right vertex $\tilde{v}_\mathcal{R}$ if a distance between the original right vertex and the corresponding approximated right vertex is less than a threshold e as follows.

$$|\tilde{v}_\mathcal{R} - v_\mathcal{R}|_2^2 \leq \epsilon. \qquad \text{Eq. (9):}$$

By replacing the original right vertex $v_\mathcal{R}$ with the corresponding approximated right vertex $\tilde{v}_\mathcal{R}$, the corresponding displacement becomes zero, which results in a reduction in newly added connectivity.

Figure 6:
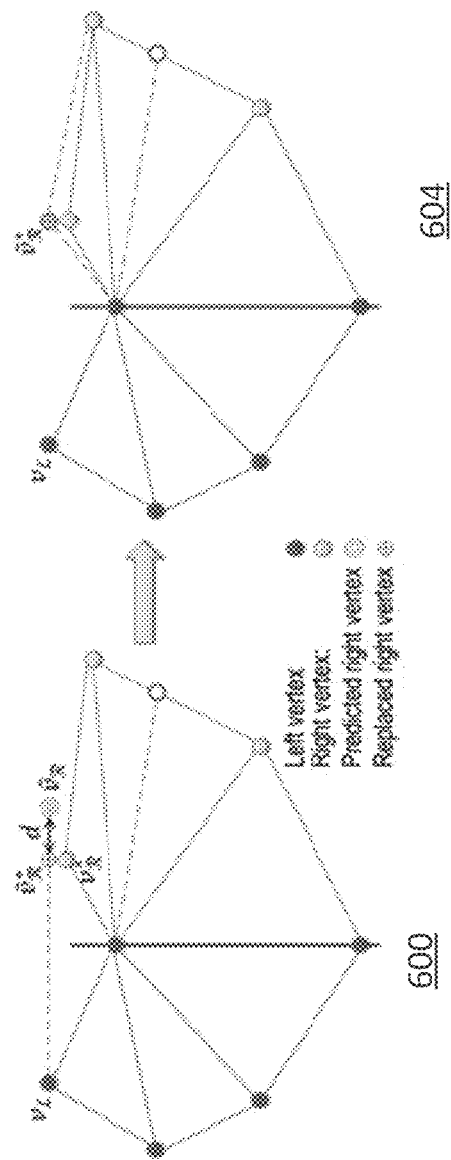
FIG. 6 illustrates an example out-of-range vertex when performing the right to left pass of a mesh.

According to one or more embodiments, for out-of-range vertices, a new connectivity is added instead of replacing original vertices $v_\mathcal{R}$ by a corresponding right approximated vertex $\tilde{v}_\mathcal{R}^*$. FIG. 6 illustrates an example mesh 600 in which an out-of-range vertex $\tilde{v}_\mathcal{R}^*$ is determined. The right side of FIG. 6 illustrates a modified mesh 604 with respect to mesh 600 in which the out-of-range $\tilde{v}_\mathcal{R}^*$ vertex is added to the mesh.

According to one or more embodiments, the left-to-right pass may be performed before the right-to-left pass. However, this order may be reversed where the right-to-left pass is performed before the left-to-right pass.

FIG. 7 illustrates an example algorithm for creating connectivity for one-to-one vertex mapping, in accordance with one or more embodiments. For an approximated vertex in both left and right (e.g., $\tilde{v}_{\mathcal{R}/L}$), this vertex may belong to a given connectivity of $\mathcal{F} = \{v_i, \ldots, v_{i+k}\}$. Given a number h corresponding to a number of connections to be split, where $h \in [2, k-1]$, new faces $\mathcal{F}^i$ may derived based on the algorithm illustrated in FIG. 7.

Figure 8:
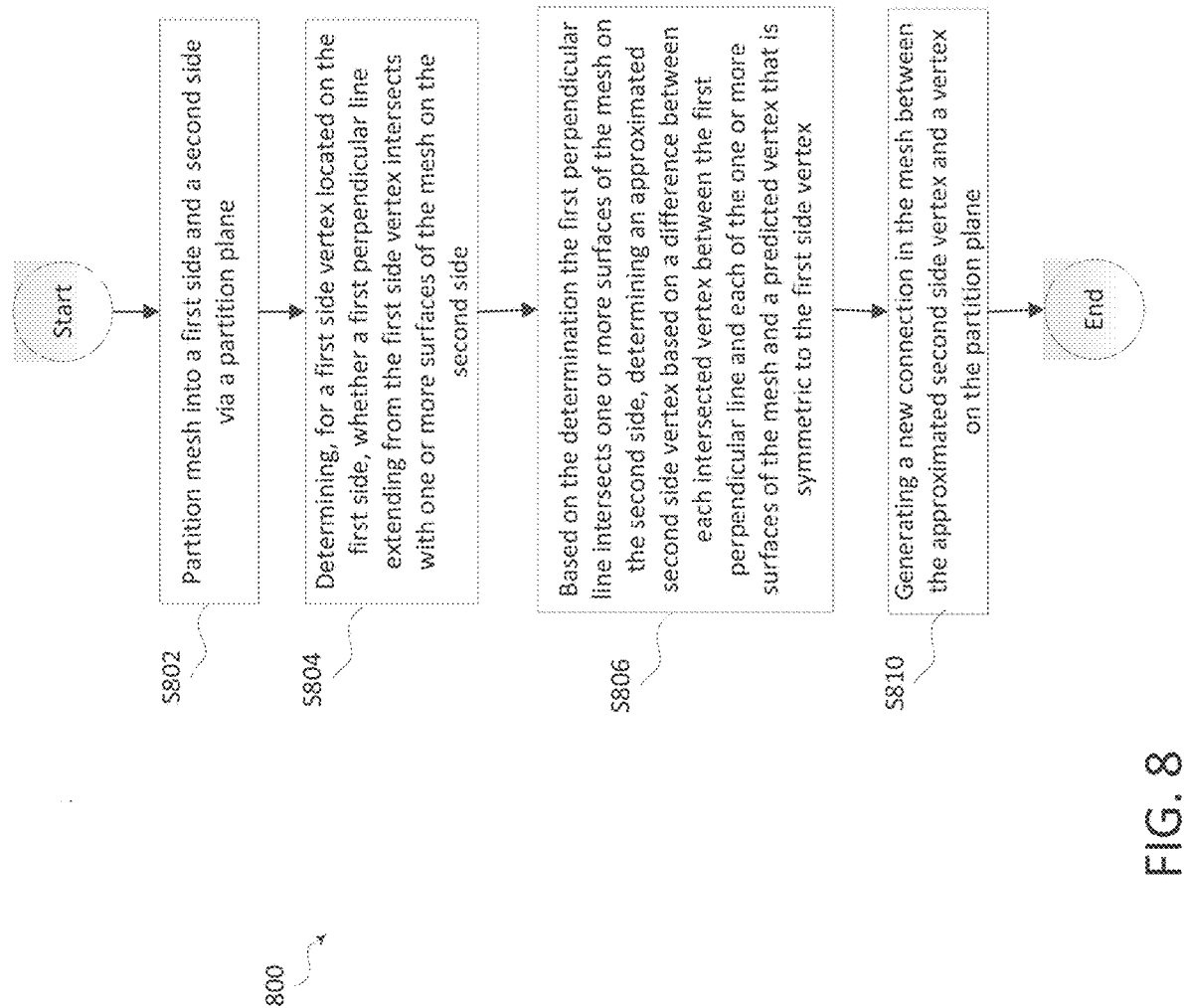
FIG. 8 illustrates an example process for symmetrizing a mesh.

FIG. 8 illustrates a flow chart of an example process 800 for symmetrizing a mesh, in accordance with one or more embodiments. The process may be performed by an encoder such as encoder 203.

The process may start at operation S802 where a mesh is partitioned into a first side and a second side via partition plane. For example, referring to FIG. 3, mesh 300 is partitioned into a left side and a right side via a symmetry plane p. Either the left side or the right side may be identified as the first side, with the other side identified as the second side.

The process proceeds to operation S804 where, for a first side vertex located on the first side, it is determined whether a first perpendicular line extending from the first side vertex intersects with one or more surfaces of the mesh on the second side. For example, referring to FIG. 3, it is determined that perpendicular line 302 intersects surfaces on the right side of mesh 300 at points: $\bar{v}_\mathcal{R}^2$ and $\bar{v}_\mathcal{R}^1$.

The process proceeds to operation S806 where based on a determination the first perpendicular line intersects one or more surfaces of the mesh on the second side, an approximated second side vertex is determined based on a difference between each intersected vertex between the first perpendicular line and each of the one or more surfaces of the mesh and a predicted vertex that is symmetric to the first side vertex. For example, based on Eq. (1), referring to FIG. 3, it is determined that vertex $\bar{v}_\mathcal{R}^1$ has a minimum distance to predicted symmetric vertex $\hat{v}_\mathcal{R}$, and therefore, $\bar{v}_\mathcal{R}^1$ is determined as the approximated vertex $v_\mathcal{R}^*$.

The process proceeds to operation S810 where a new connection in the mesh between the approximated second side vertex and a vertex on the partition plane is added. For example, referring to FIG. 3, after vertex $\bar{v}_\mathcal{R}^1$ is determined as the approximated vertex, a new connection line between $\bar{v}_\mathcal{R}^1$ and a vertex on the symmetry plane p is added to mesh 304.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
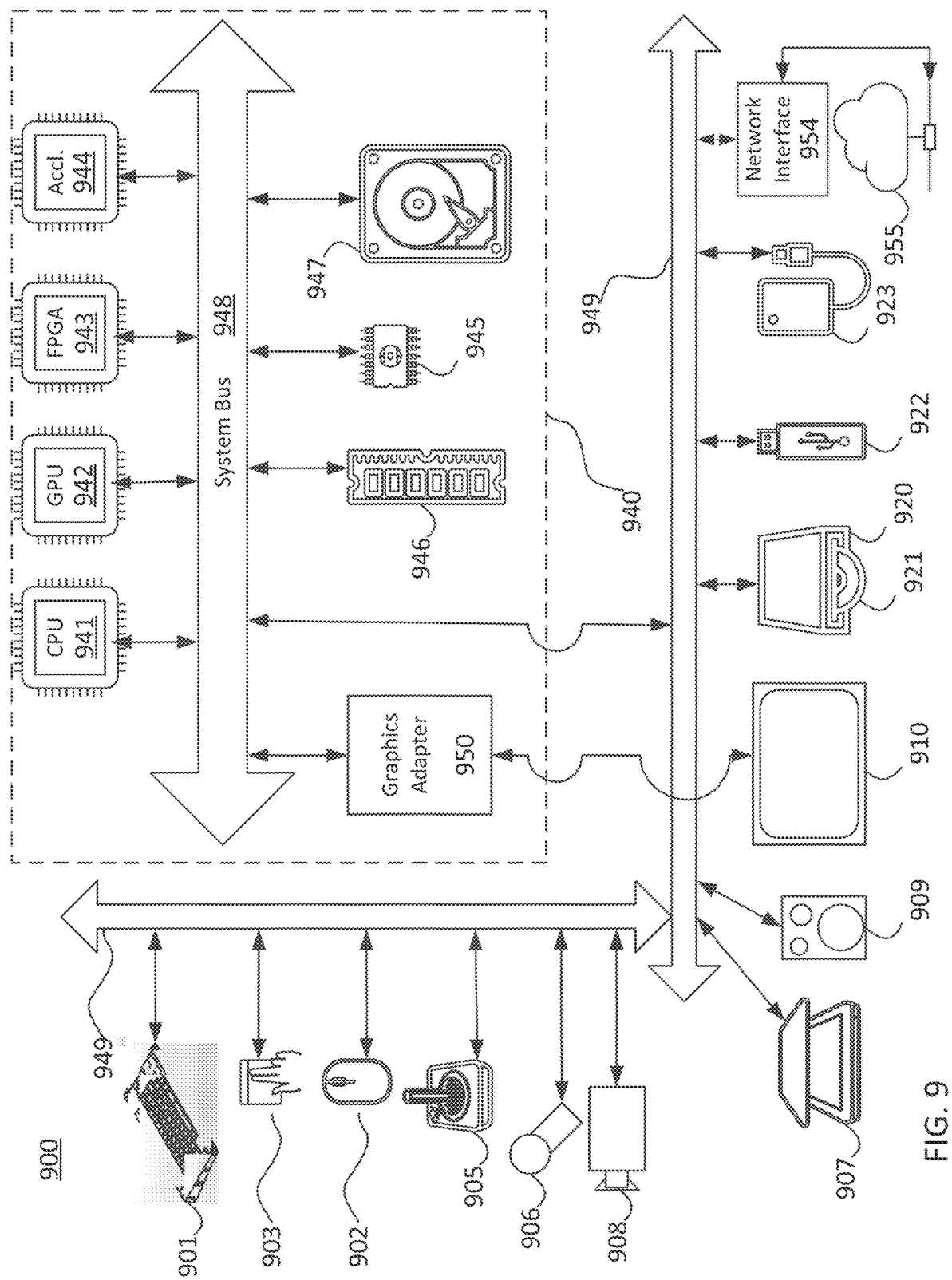
FIG. 9 is a diagram of a computer system suitable for implementing the embodiments of the present disclosure.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output: virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s) (including CPU, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (e.g., accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of encoding a mesh, comprising: partitioning a mesh into a first side and a second side via a partition plane, in which the second side is opposite to the first side in the mesh; determining, for a first vertex located on the first side, whether a first perpendicular line extending from the first vertex intersects with two or more surfaces of the mesh on the second side, each intersection of the first perpendicular line corresponding to an intersected vertex on the second side: based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex: and generating a new connection in the mesh between the second vertex and another vertex on the partition plane.

(2) The method of feature (1), in which based on the determination the first perpendicular line does not intersect any surface of the mesh on the second side, selecting the second vertex based on a difference between the predicted vertex that is symmetric to the first side vertex and each vertex on the second side.

(3) The method of feature (2), in which based on the determination the first perpendicular line does not intersect any surface of the mesh on the second side, the second vertex is selected as a vertex on the second side having a minimum distance to the predicted vertex that is symmetric to the first vertex.

(4) The method of any one of features (1)-(3), further comprising: determining whether a distance between a nearest approximated vertex to the second vertex located on the second side of the mesh and the second vertex is less than a threshold; and based on a determination the distance is not less than the threshold, determining, for the second vertex, whether a second perpendicular line extending from the second vertex intersects with two or more surfaces of the mesh on the first side, each intersection of the second perpendicular line corresponding to an intersected vertex on the first side, based on the determination the second perpendicular line intersects with two or more surfaces of the mesh on the first side, selecting one of the intersected vertices on the first side as a third vertex corresponding to the second vertex based on a shortest distance between each intersected vertex on the first side and a predicted vertex on the first side that is symmetric to the second vertex, and generating a new connection in the mesh between the third vertex and a vertex on the partition plane.

(5) The method of feature (4), in which based on the determination the second perpendicular line does not intersect any surface of the mesh on the first side, selecting the third vertex based on a difference between the predicted vertex that is symmetric to the second side vertex and each vertex on the first side.

(6) The method of feature (5), in which based on the determination the second perpendicular line does not intersect any surface on the first side, the third vertex is selected as a vertex on the first side having a minimum distance to the predicted vertex on the first side that is symmetric to the second side vertex.

(7) The method of feature (5) or (6), in which the second vertex replaces a fourth vertex located on the second side based on a determination that a distance between the second vertex and the fourth vertex is less than a threshold.

(8) The method of feature (1), in which the mesh is encoded based on the first vertex and a displacement between the second vertex and the predicted vertex on the second side that is symmetric to the first vertex.

(9) An encoder comprising: at least one memory configured to store program code; and at least one processor configured to read the program code and operate as instructed by the program code, the program code including: partitioning code configured to cause the at least one processor to partition a mesh into a first side and a second side via a partition plane, in which the second side is opposite to the first side in the mesh, first determining code configured to cause the at least one processor to determine, for a first vertex located on the first side, whether a first perpendicular line extending from the first vertex intersects with two or more surfaces of the mesh on the second side, each intersection of the first perpendicular line corresponding to an intersected vertex on the second side, first selecting code configured to cause the at least one processor to select, based on the determination the first perpendicular line intersects with two or more surfaces of the mesh on the second side, select one of the intersected vertices on the second side as a approximated second vertex corresponding to the first vertex based on a shortest distance between each intersected vertex and a predicted vertex on the second that is symmetric to the first vertex, and first generating code configured to cause the at least one processor to generate a new connection in the mesh between the approximated second side vertex and a vertex on the partition plane.

(10) The encoder of feature (9), in which based on the determination the first perpendicular line does not intersect any surface of the mesh on the second side, the first selecting code further causes the processor to select the second vertex based on a difference between the predicted vertex that is symmetric to the first side vertex and each vertex on the second side.

(11) The encoder of feature (10), in which based on the determination the first perpendicular line does not intersect any surface on the second side, the second vertex is selected as a vertex on the second side having a minimum distance to the predicted vertex that is symmetric to the first vertex.

(12) The encoder of any one of features (9)-(11), in which the program code further comprises: second determining code configured to cause the at least one processor to determine whether a distance between a nearest approximated vertex to the second vertex located on the second side of the mesh and the second vertex is less than a threshold, and based on a determination the distance is not less than the threshold, third determining code configured to cause the at least one processor to determine, for the second vertex, whether a second perpendicular line extending from the second vertex intersects with two or more surfaces of the mesh on the first side, each intersection of the second perpendicular line corresponding to an intersected vertex on the first side, based on the determination the second perpendicular line intersects one or more surfaces of the mesh on the first side, second selecting code configured to cause the at least one processor to select one of the intersected vertices on the first side as a third vertex corresponding to the second vertex based on a shortest distance between each intersected vertex on the first side and a predicted vertex on the first side that is symmetric to the second side vertex, and second generating code configured to cause the at least one processor to generate a new connection in the mesh between the third vertex and a vertex on the partition plane.

(13) The encoder of feature (12), in which the second selecting code further cause the at least one processor to select, based on the determination the second perpendicular line does not intersect any surface of the mesh on the first side, the third vertex based on a difference between the predicted vertex on the first side that is symmetric to the second side vertex and each vertex on the first side.

(14) The encoder of feature (13), in which based on the determination the second perpendicular line does not intersect any surface of the mesh on the first side, the third vertex is selected as a vertex on the first side having a minimum distance to the predicted vertex on the first side that is symmetric to the second side vertex.

(15) The encoder of any one of features (9)-(14), in which the second vertex replaces a fourth vertex located on the second side based on a determination that a distance between the second vertex and the fourth vertex is less than a threshold.

(16) A non-transitory computer readable medium having instructions stored therein, which when executed by a processor in an encoder cause the processor to execute a method of comprising: partitioning a mesh into a first side and a second side via a partition plane: determining, for a first side vertex located on the first side, whether a first perpendicular line extending from the first side vertex intersects with one or more surfaces of the mesh on the second side, each intersection of the first perpendicular line with a surface of the mesh on the first side corresponding to an intersected vertex: based on the determination the first perpendicular line intersects one or more surfaces of the mesh on the second side, determining an approximated second side vertex based on a difference between each intersected vertex between the first perpendicular line and each of the one or more surfaces of the mesh and a predicted vertex that is symmetric to the first side vertex; and generating a new connection in the mesh between the approximated second side vertex and a vertex on the partition plane.

(17) The non-transitory computer readable medium of feature (16), in which the method further comprises, based on the determination the first perpendicular line does not intersect any surface of the mesh on the second side, selecting the second vertex based on a difference between the predicted vertex that is symmetric to the first side vertex and each vertex on the second side.

(18) The non-transitory computer readable medium of feature (17), in which based on the determination the first perpendicular line does not intersect any surface of the mesh on the second side, the second vertex is selected as a vertex on the second side having a minimum distance to the predicted vertex that is symmetric to the first vertex.

(19) The non-transitory computer readable medium of any one of features (16)-(19), in which the method further comprises: determining whether a distance between a nearest approximated vertex to the second vertex located on the second side of the mesh and the second vertex is less than a threshold: and based on a determination the distance is not less than the threshold, determining, for the second vertex, whether a second perpendicular line extending from the second vertex intersects with two or more surfaces of the mesh on the first side, each intersection of the second perpendicular line corresponding to an intersected vertex on the first side, based on the determination the second perpendicular line intersects with two or more surfaces of the mesh on the first side, selecting one of the intersected vertices on the first side as a third vertex corresponding to the second vertex based on a shortest distance between each intersected vertex on the first side and a predicted vertex on the first side that is symmetric to the second vertex, and generating a new connection in the mesh between the third vertex and a vertex on the partition plane.

(20) The non-transitory computer readable medium of feature (19), in which based on the determination the second perpendicular line does not intersect any surface of the mesh on the first side, selecting the third vertex based on a difference between the predicted vertex that is symmetric to the second side vertex and each vertex on the first side.

What is claimed is:

1. A method performed by at least one processor of encoding a mesh, comprising:
    partitioning a mesh into a first side and a second side via a partition plane, wherein the second side is opposite to the first side in the mesh;
    determining, for a first vertex located on the first side, whether a first perpendicular line extending from the first vertex intersects with two or more surfaces of the mesh on the second side, each intersection of the first perpendicular line corresponding to an intersected vertex on the second side;
    based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex; and
    generating a new connection in the mesh between the second vertex and another vertex on the partition plane.

2. The method of claim 1, wherein based on the determination the first perpendicular line does not intersect any surface of the mesh on the second side, selecting the second vertex based on a difference between the predicted vertex that is symmetric to the first vertex and each vertex on the second side.

3. The method of claim 2, wherein based on the determination the first perpendicular line does not intersect any surface of the mesh on the second side, the second vertex is selected as a vertex on the second side having a minimum distance to the predicted vertex that is symmetric to the first vertex.

4. The method of claim 1, further comprising:
    determining whether a distance between a nearest approximated vertex to the second vertex located on the second side of the mesh and the second vertex is less than a threshold; and
    based on a determination the distance is not less than the threshold,
        determining, for the second vertex, whether a second perpendicular line extending from the second vertex intersects with two or more surfaces of the mesh on the first side, each intersection of the second perpendicular line corresponding to an intersected vertex on the first side, based on the determination the second perpendicular line intersects with two or more surfaces of the mesh on the first side, selecting one of the intersected vertices on the first side as a third vertex corresponding to the second vertex based on a shortest distance between each intersected vertex on the first side and a predicted vertex on the first side that is symmetric to the second vertex, and generating a new connection in the mesh between the third vertex and a vertex on the partition plane.

5. The method of claim 4, wherein based on the determination the second perpendicular line does not intersect any surface of the mesh on the first side, selecting the third vertex based on a difference between the predicted vertex that is symmetric to the second vertex and each vertex on the first side.

6. The method of claim 5, wherein based on the determination the second perpendicular line does not intersect any surface on the first side, the third vertex is selected as a vertex on the first side having a minimum distance to the predicted vertex on the first side that is symmetric to the second vertex.

7. The method of claim 5, wherein the second vertex replaces a fourth vertex located on the second side based on a determination that a distance between the second vertex and the fourth vertex is less than a threshold.

8. The method of claim 1, wherein the mesh is encoded based on the first vertex and a displacement between the second vertex and the predicted vertex on the second side that is symmetric to the first vertex.

9. An encoder comprising:
at least one memory configured to store program code; and
at least one processor configured to read the program code and operate as instructed by the program code, the program code including:
partitioning code configured to cause the at least one processor to partition a mesh into a first side and a second side via a partition plane, wherein the second side is opposite to the first side in the mesh,
first determining code configured to cause the at least one processor to determine, for a first vertex located on the first side, whether a first perpendicular line extending from the first vertex intersects with two or more surfaces of the mesh on the second side, each intersection of the first perpendicular line corresponding to an intersected vertex on the second side,
first selecting code configured to cause the at least one processor to select, based on the determination the first perpendicular line intersects with two or more surfaces of the mesh on the second side, select one of the intersected vertices on the second side as a second vertex corresponding to the first vertex based on a shortest distance between each intersected vertex and a predicted vertex on the second side that is symmetric to the first vertex, and
first generating code configured to cause the at least one processor to generate a new connection in the mesh between the second vertex and a vertex on the partition plane.

10. The encoder of claim 9, wherein based on the determination the first perpendicular line does not intersect any surface of the mesh on the second side, the first selecting code further causes the processor to select the second vertex based on a difference between the predicted vertex that is symmetric to the first vertex and each vertex on the second side.

11. The encoder of claim 10, wherein based on the determination the first perpendicular line does not intersect any surface on the second side, the second vertex is selected as a vertex on the second side having a minimum distance to the predicted vertex that is symmetric to the first vertex.

12. The encoder of claim 9, wherein the program code further comprises:
second determining code configured to cause the at least one processor to determine whether a distance between a nearest approximated vertex to the second vertex located on the second side of the mesh and the second vertex is less than a threshold, and
based on a determination the distance is not less than the threshold,
third determining code configured to cause the at least one processor to determine, for the second vertex, whether a second perpendicular line extending from the second vertex intersects with two or more surfaces of the mesh on the first side, each intersection of the second perpendicular line corresponding to an intersected vertex on the first side,
based on the determination the second perpendicular line intersects one or more surfaces of the mesh on the first side, second selecting code configured to cause the at least one processor to select one of the intersected vertices on the first side as a third vertex corresponding to the second vertex based on a shortest distance between each intersected vertex on the first side and a predicted vertex on the first side that is symmetric to the second vertex, and
second generating code configured to cause the at least one processor to generate a new connection in the mesh between the third vertex and a vertex on the partition plane.

13. The encoder of claim 12, wherein the second selecting code further cause the at least one processor to select, based on the determination the second perpendicular line does not intersect any surface of the mesh on the first side, the third vertex based on a difference between the predicted vertex on the first side that is symmetric to the second vertex and each vertex on the first side.

14. The encoder of claim 13, wherein based on the determination the second perpendicular line does not intersect any surface of the mesh on the first side, the third vertex is selected as a vertex on the first side having a minimum distance to the predicted vertex on the first side that is symmetric to the second vertex.

15. The encoder of claim 9, wherein the second vertex replaces a fourth vertex located on the second side based on a determination that a distance between the second vertex and the fourth vertex is less than a threshold.

16. A non-transitory computer readable medium having instructions stored therein, which when executed by a processor in an encoder cause the processor to execute a method of comprising:
partitioning a mesh into a first side and a second side via a partition plane, wherein the second side is opposite to the first side in the mesh;
determining, for a first vertex located on the first side, whether a first perpendicular line extending from the first vertex intersects with two or more surfaces of the mesh on the second side, each intersection of the first perpendicular line corresponding to an intersected vertex on the second side;

based on the determination the first perpendicular line intersects with two or more surfaces of the mesh on the second side, selecting one of the intersected vertices on the second side as a second vertex corresponding to the first vertex based on a shortest distance between each intersected vertex and a predicted vertex on the second side that is symmetric to the first vertex; and generating a new connection in the mesh between the second vertex and another vertex on the partition plane.

17. The non-transitory computer readable medium of claim 16, wherein the method further comprises, based on the determination the first perpendicular line does not intersect any surface of the mesh on the second side, selecting the second vertex based on a difference between the predicted vertex that is symmetric to the first vertex and each vertex on the second side.

18. The non-transitory computer readable medium of claim 17, wherein based on the determination the first perpendicular line does not intersect any surface of the mesh on the second side, the second vertex is selected as a vertex on the second side having a minimum distance to the predicted vertex that is symmetric to the first vertex.

19. The non-transitory computer readable medium of claim 16, wherein the method further comprises:

determining whether a distance between a nearest approximated vertex to the second vertex located on the second side of the mesh and the second vertex is less than a threshold; and based on a determination the distance is not less than the threshold, determining, for the second vertex, whether a second perpendicular line extending from the second vertex intersects with two or more surfaces of the mesh on the first side, each intersection of the second perpendicular line corresponding to an intersected vertex on the first side, based on the determination the second perpendicular line intersects with two or more surfaces of the mesh on the first side, selecting one of the intersected vertices on the first side as a third vertex corresponding to the second vertex based on a shortest distance between each intersected vertex on the first side and a predicted vertex on the first side that is symmetric to the second vertex, and generating a new connection in the mesh between the third vertex and a vertex on the partition plane.

20. The non-transitory computer readable medium of claim 19, wherein based on the determination the second perpendicular line does not intersect any surface of the mesh on the first side, selecting the third vertex based on a difference between the predicted vertex that is symmetric to the second vertex and each vertex on the first side.

* * * * *